(12) United States Patent
Wolleschensky

(10) Patent No.: US 7,746,553 B2
(45) Date of Patent: Jun. 29, 2010

(54) LASER SCANNING MICROSCOPE FOR FLUORESCENCE TESTING

(75) Inventor: Ralf Wolleschensky, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 251 days.

(21) Appl. No.: 11/878,997

(22) Filed: Jul. 30, 2007

(65) Prior Publication Data

US 2008/0062511 A1 Mar. 13, 2008

(30) Foreign Application Priority Data

Jul. 28, 2006 (DE) .................. 10 2006 034 912

(51) Int. Cl.
*G02B 21/06* (2006.01)
(52) U.S. Cl. ...................... 359/389; 359/385
(58) Field of Classification Search ................. 359/385, 359/389
See application file for complete search history.

(56) References Cited

U.S. PATENT DOCUMENTS

| | | | |
|---|---|---|---|
| 3,973,827 A | 8/1976 | Uetake | |
| 5,283,433 A | 2/1994 | Tsien | |
| 6,388,807 B1 * | 5/2002 | Knebel et al. | 359/368 |
| 6,486,458 B1 | 11/2002 | Schoeppe et al. | |
| 6,563,632 B1 | 5/2003 | Schoeppe et al. | |
| 7,009,699 B2 | 3/2006 | Wolleschensky et al. | |
| 2003/0011772 A1 | 1/2003 | Katsuyaki et al. | |
| 2004/0012774 A1 * | 1/2004 | Lange | 356/237.1 |
| 2005/0122579 A1 * | 6/2005 | Sasaki | 359/385 |
| 2006/0011857 A1 | 1/2006 | Funk et al. | |
| 2009/0046360 A1 | 2/2009 | Funk et al. | |

FOREIGN PATENT DOCUMENTS

| | | |
|---|---|---|
| DE | 2243385 A1 | 2/1974 |
| DE | 197 02 753 A1 | 7/1998 |
| DE | 19702753 A1 | 7/1998 |
| EP | 1617253 A1 | 1/2006 |
| GB | 1307032 A | 2/1973 |

* cited by examiner

*Primary Examiner*—Joshua L Pritchett
(74) *Attorney, Agent, or Firm*—Jacobson Holman PLLC

(57) ABSTRACT

Laser scanning microscope for fluorescence testing, in which the illumination and detection rays are bound optically through a dichroic main beam splitter, the detected probe light being led to several detectors by means of a secondary beam splitter and the angle of incidence of the illumination light and/or the angle of incidence of the probe light at the splitter surface of at least the main beam splitter or at least the secondary splitter is less than 45 degrees.

12 Claims, 4 Drawing Sheets

LASER SCANNING MICROSCOPE FOR FLUORESCENCE TESTING

BACKGROUND OF THE INVENTION (1) Field of the Invention

The invention relates to laser scanning microscopes, in general, and to laser scanning microscopes that use different excitations wavelengths for different dyes, in particular.

(2) Description of Related Art Including Information Disclosed UNDER 37 CFR 1.97 AND 1.98

A laser scanning microscope (LSM) can be divided essentially in four modules as shown in FIG. 1: light source, scan module, detection unit and microscope. These modules are described in more detail in the DE19702753A1 and U.S. Pat. No. 6,563,632 B1 which are incorporated by reference herein as if reproduced in full.

Lasers with different wavelengths are used in the LSM for specific excitation of the different color substances or dyes in a preparation. The selection of the excitation wavelength is based on the absorption properties of the dye to be tested. The excitation light is created in the light sources module LS. For this different lasers are used here (Argon, Argon Krypton, TiSa-Laser). The combining of different wavelengths in the light source module is done through beam splitter BS or mirror as shown in FIG. 1 in the light source module LS. Further the selection of wavelengths and the setting of intensity of the required excitation wavelength is also done in the light source module, e.g., through the use of an attenuator AT such as an acoustic-optical crystal (AOTF). Subsequently, the illumination ray from the laser reaches the scan module through a fiber FB or a suitable mirror arrangement.

The illumination ray created in the light source is focused on the preparation with the help of the lens diffraction limited through the scanner SC, the scan optics SO and the tubular lens TL. The focus scans the specimen SP in point raster in the x-y direction. The pixel dwell times when scanning over the specimen lie mostly in the range of less than a microsecond up to few seconds.

In confocal detection (descanned detection) of the fluorescence light, the detection light, which is emitted from the focal plane of the specimen SP and from the planes above and below it, reaches a dichroic beam splitter (MDB) via the scanner. This separates the fluorescence light from the excitation light. Subsequently, the fluorescence light is focused on a slit (confocal slit/pinhole), which is exactly in a plane conjugated to the focal plane. Through this the fluorescence light components which are outside the focus are suppressed. Through varying of the size of the pinhole, the optical resolution of the microscope can be set.

Behind the pinhole PH is a further dichroic block filter EF which suppresses the excitation light once again. The fluorescence light is measured by means of a point detector PMT after passing through the block filter EF.

With the use of multiphoton absorption, the excitation of the color substance (dye) fluorescence happens in a small volume in which the intensity of the excitation is particularly high. With the use of a confocal arrangement, this area is only insignificantly larger than the detected area. The use of a confocal pinhole can therefore be skipped and the detection can happen directly after the objective lens OB as non-descanned detection.

In another arrangement for detection of a dye fluorescence excited through multiphoton absorption, a descanned detection is carried out; however, this time, the pupil of the lens is reproduced in the detection unit (non-confocal descanned detection).

With both the detection arrangements together with the corresponding single-photon or multiphoton absorption only the level (optical section) is reproduced by a three-dimensional lighted picture which lies at the focal plane of the lens. By recording several optical levels in the x-y plane at different depths z of the specimen SP, subsequently a three dimensional picture of the specimen can be generated with the assistance of computers.

The LSM is thus suitable for investigation of thick preparations. The excitation wavelengths are determined by the used dye with its specific absorption properties. The dichroic filters adapted to the emission characteristics of the dye make sure that only fluorescence light emitted by the respective dye is measured by the point detector.

At present, in biomedical applications, several different cell regions are labeled with different dyes at the same time (multifluorescence). The individual dyes can be separately reproduced with the state of the technology on the basis of either different absorption characteristics or emission characteristics (spectra). For this, an additional division of the fluorescence light from several dyes is done with the secondary beam splitters DBS and a separate detection of the individual dye emissions in separate point detectors PMT x.

The LSM LIVE of the Carl Zeiss MicroImaging GmbH realizes a very fast line scanner with a picture creation of about 120 pictures per second http://www.zeiss.de/c12567be00459794/Contents-Frame/fd9fa0090eee01a641256a550036267b.

BRIEF SUMMARY OF THE INVENTION

The present invention is for a laser scanning microscope for fluorescence testing using various dyes. In the laser scanning microscope, the illumination and detection rays are bound optically through a dichroic main beam splitter. The detected light from the specimen is led to several detectors by means of a secondary beam splitter and the angle of incidence of the illumination light and/or the angle of incidence of the specimen light at the splitter surface of at least the main beam splitter or at least the secondary beam splitter is less than 45 degrees.

DETAILED DESCRIPTION OF THE INVENTION

Figure 1:
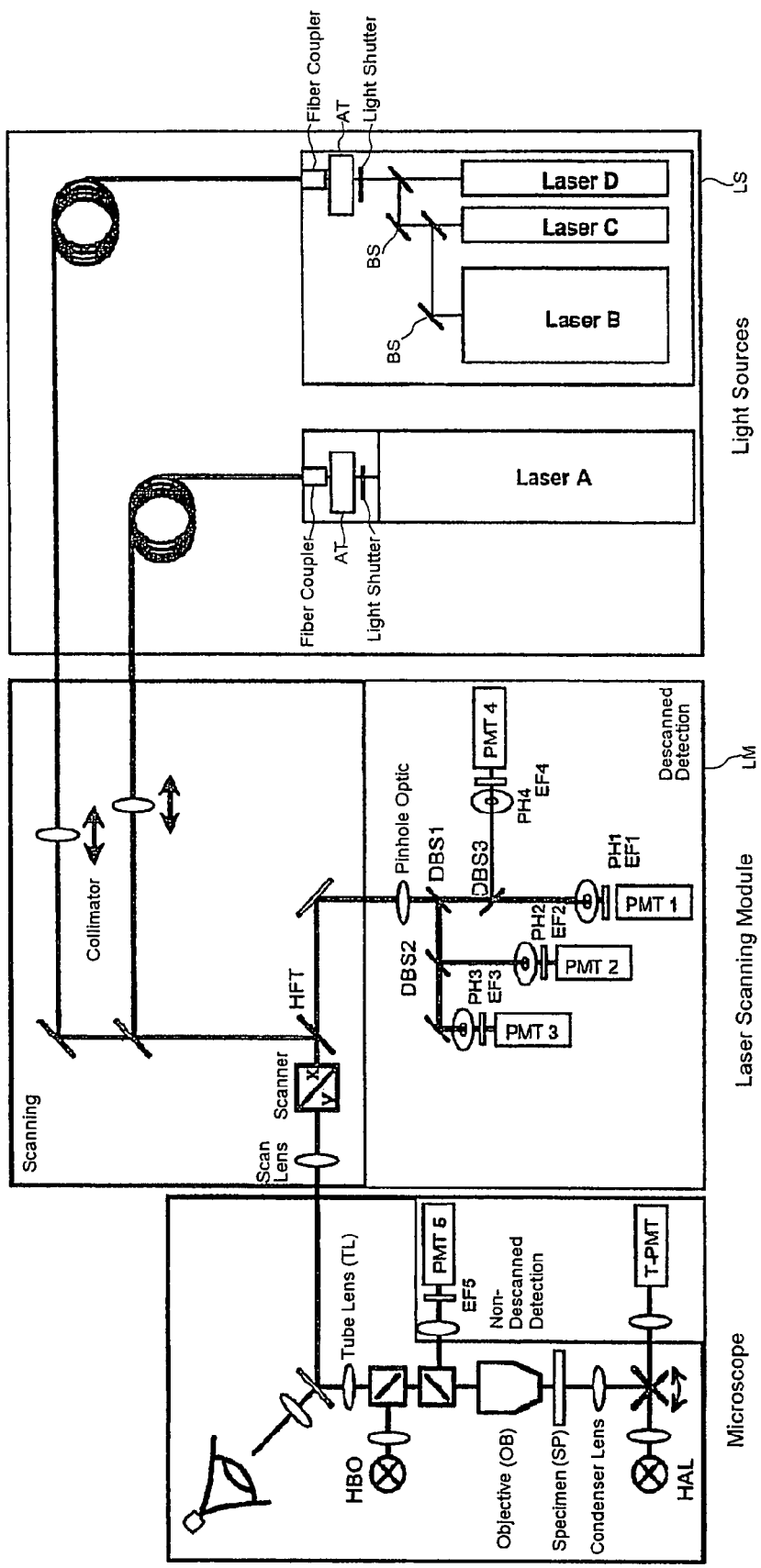
FIG. 1 is a prior art diagram of a laser scanning microscope.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. The state of the technology is shown in detail in FIG. 2, the invention in FIG. 3.

Figure 2:
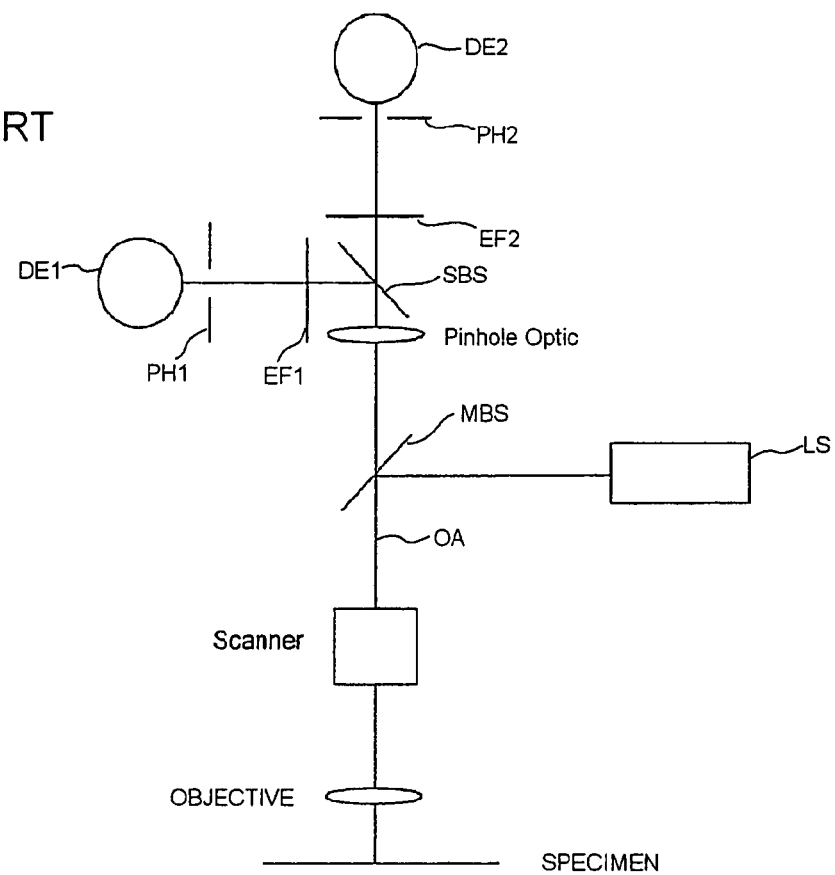
FIG. 2 is a schematic diagram of a portion of the laser scanning microscope of FIG. 1.

In FIG. 2, a main beam splitter is provided for reflecting illumination rays from a light source LS in the direction of the specimen SP through a lens. The detection rays in the form of specimen light reaches through the main beam splitter MBS in the direction of the detectors DE 1 and DE2 through pinhole optics PH1 and PH2 and a secondary beam splitter SBS. Here, for the specimen light, suppression of the illumination light reflected by the specimen and diffraction light takes place to be able to investigate the targeted appearances of fluorescence.

Additionally, special narrow band emission filters EF1 and EF2 are placed before the detectors to shut out the remaining disturbance radiation. Main and secondary beam splitters MBS, SBS are each arranged at an angle of 45 degrees to the optical axis.

Figure 3:
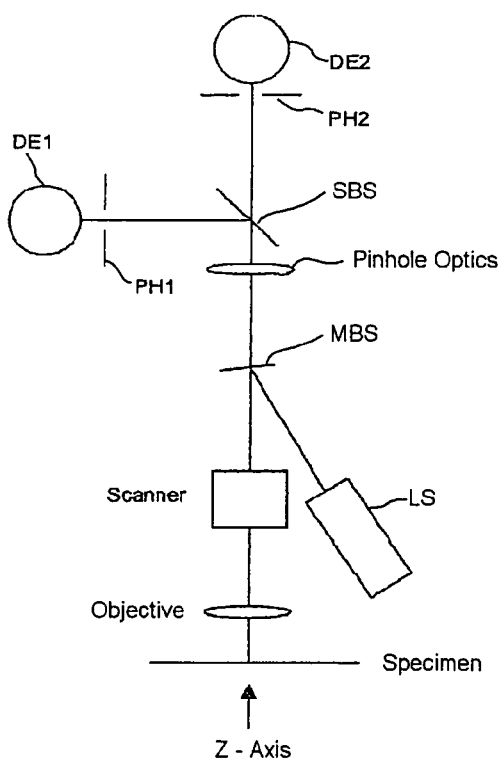
FIG. 3 is a schematic diagram of a portion of a laser scanning microscope embodying the present invention.

According to the invention, in FIG. 3 an arrangement of the partially mirrored surface of the main beam splitter MBS is advantageously made at an angle A smaller than 45 degrees to the optical axis OA. The light source LS is placed under an angle smaller than 90 degrees to the optical axis of the microscope.

Figure 4:
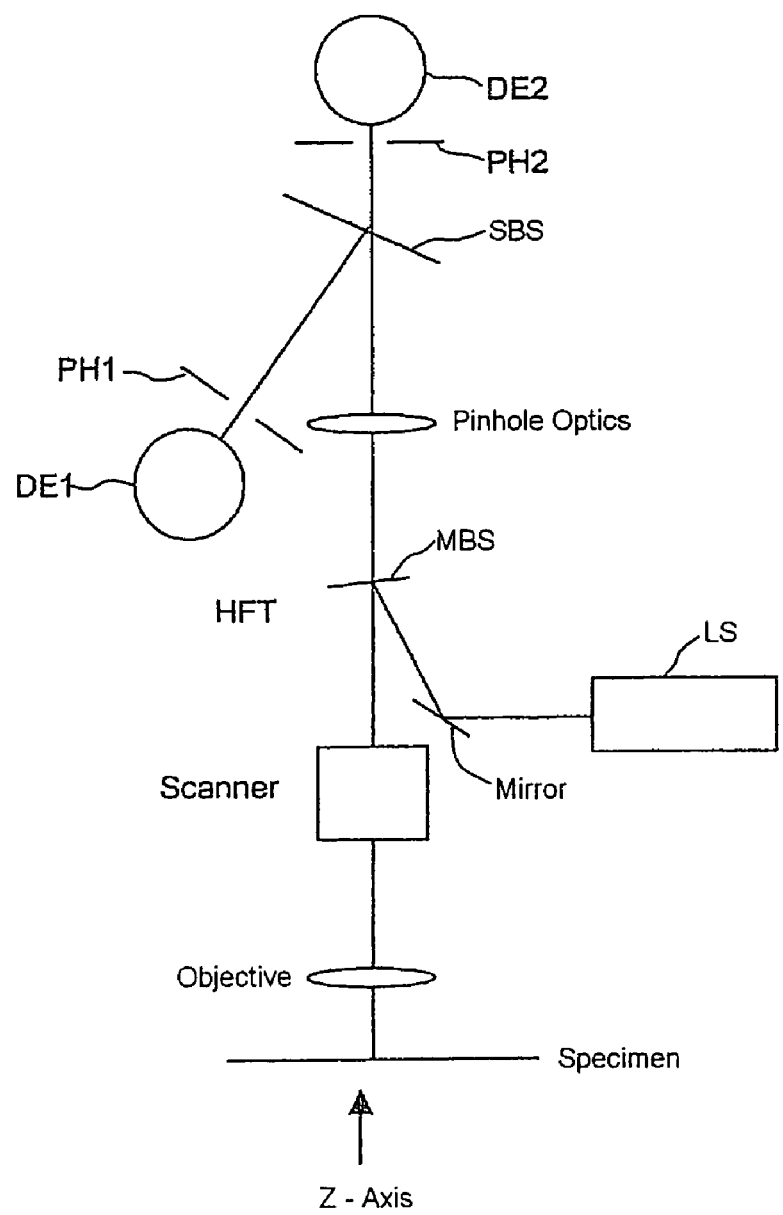
FIG. 4 is a schematic diagram of another embodiment of the present invention.

In FIG. 4, another arrangement is shown according to the invention. Here, additionally, the secondary beam splitter SBS is arranged at an angle B smaller than 45 degrees to the optical axis OA. Advantageously, through this arrangement of the beam splitter with an angle smaller than 45 degree the filtering effect of the MBS and SBS is so strong (OD greater than 5 or 3 respectively) that no additional emission filters are needed before the pinholes PH1 and PH2.

According to the invention the layer design is so changed that it is directed at a meeting smaller than 45 degrees, advantageously at an angle up to 20 degrees, i.e., at this preferred angle the optimum reflection and transmission properties are exhibited.

Coatings adjusted to special angles of incidence for notch filters are realized with, for example, http://www.semrock.com/Cataloq/NotchSpectrumvsAOI.htm.

It is known according to the invention that it is advantageous for the beam splitter that the optical density ("OD") of the coat decreases the greater the distance from a meeting angle of zero.

Figure 5:
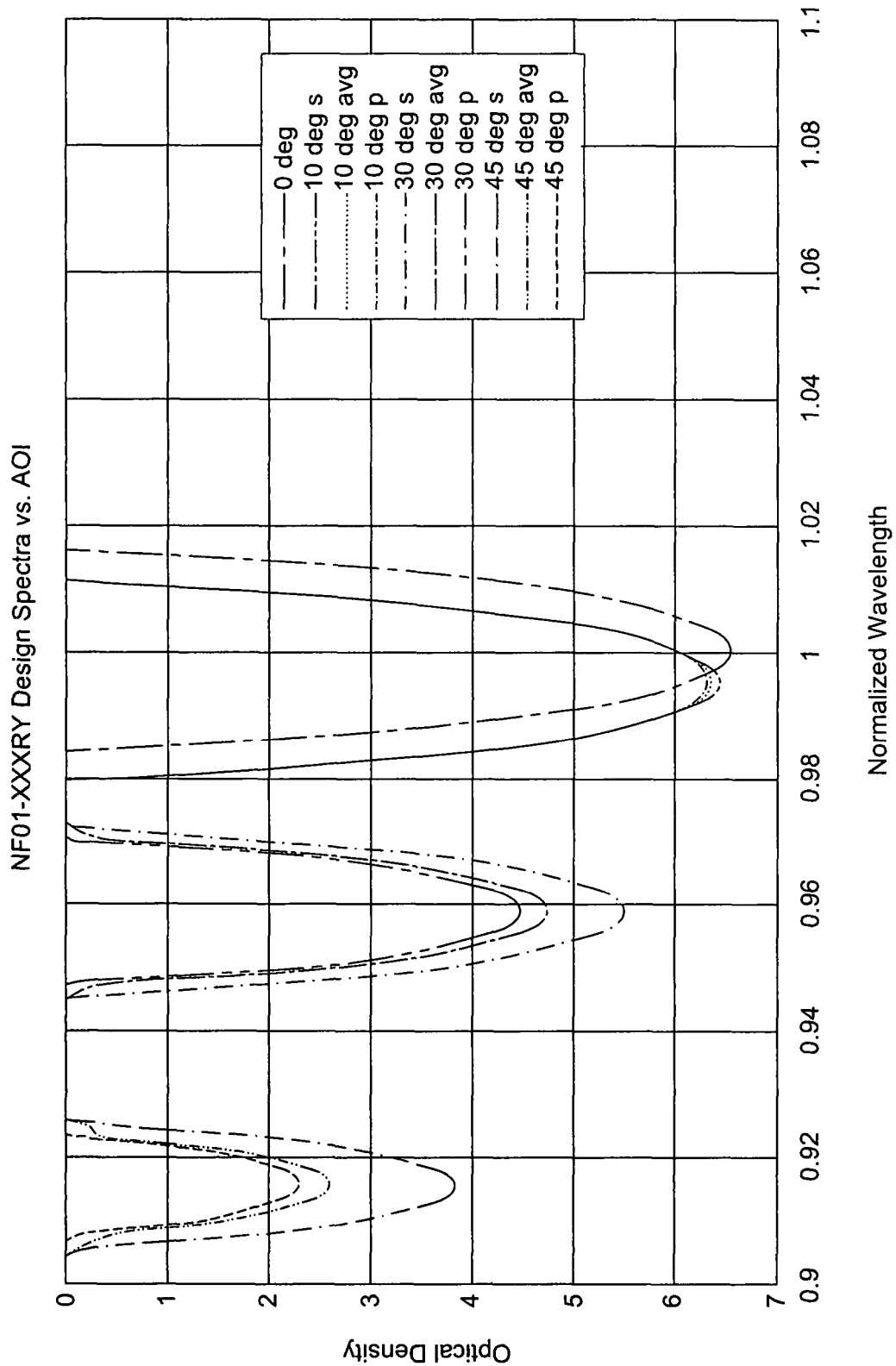
FIG. 5 is a graph showing a possible filter characteristic for differing angles.

According to the invention, a higher degree of optical density of the coat is reached with angles less than 45 degrees. A possible filter characteristic is shown, for example, in FIG. 5 (transmission depending on the wavelength) for different angles. The strong suppression of the excitation wavelengths in transmission, i.e., in the direction of the detectors for angles smaller than 45 degree to optical axis, is clear.

Particularly advantageous is the arrangement of the MBS and/or SBS with an angle of 5 to 20 degree. To realize an improved separation in space between incoming and outgoing rays reflected at the beam splitter, a mirror MR can additionally be set up (see FIG. 4), which effects an increase of the angle of the ray coming from the light source LS in relation to the optical axis OA. This mirror can also be, particularly advantageously, a part of the MBS/SBS.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

The invention claimed is:

1. A laser scanning microscope for fluorescence testing of a specimen, the laser scanning microscope comprising:
   an optical axis:
   means for producing illumination rays along the optical axis in the direction of the specimen;
   means for producing detection rays from the specimen along the optical axis;
   a dichroic main beam splitter in the optical axis for optically guiding the illumination and detection rays, the main beam splitter having a surface;
   a plurality of detectors; and
   means for directing the detected rays to the plurality of detectors so that the angle of incidence of the illumination rays at the surface of the main beam splitter is less than 20 degrees.

2. The laser scanning microscope of claim 1, further comprising:
   a dichroic secondary beam splitter in the optical axis for optically guiding the illumination and detection rays; and
   means for directing the detected rays to the plurality of detectors so that the angle of incidence of the detected rays at the surface of secondary beam splitter is less than 45 degrees.

3. The laser scanning microscope according to claim 2, wherein the main beam splitter shows a suppression of the illumination light of at least OD=5 and the secondary beam splitter a suppression of the illumination light of less than OD=3, wherein OD is the optical density.

4. Laser scanning microscope according to claim 2, wherein the main beam splitter comprises a variable filter that variably changes along a gradient.

5. The laser scanning microscope according to claim 1, wherein the main beam splitter shows a suppression of the illumination light of at least OD=5, wherein OD is the optical density.

6. The laser scanning microscope according to claim 1, wherein the main beam splitter comprises a variable filter that variably changes along a gradient.

7. Laser scanning microscope according to claim 1, wherein the main beam splitter comprises a variable filter that variably changes along a gradient.

8. A laser scanning microscope for fluorescence testing of a specimen, the laser scanning microscope comprising:
   an optical axis;
   means for producing illumination rays along the optical axis in the direction of the specimen;
   means for producing detection rays from the specimen along the optical axis;
   a dichroic secondary beam splitter in the optical axis for optically guiding the illumination and detection rays;
   a plurality of detectors; and
   means for directing the detected rays to the plurality of detectors so that the angle of incidence of the detected rays at the surface of secondary beam splitter is less than 20 degrees.

9. The laser scanning microscope according to claim 8, wherein the secondary beam splitter a suppression of the illumination light of less than OD=3 wherein OD is the optical density.

10. The laser scanning microscope according to claim 9, wherein the beam splitter comprises a variable filter that variably changes along a gradient.

11. The laser scanning microscope according to claim 8, wherein the secondary beam splitter comprises a variable filter that variably changes along a gradient.

12. The laser scanning microscope according to claim 8, wherein the beam splitter comprises a variable filter that variably changes along a gradient.

* * * * *